Dec. 18, 1962 J. L. MOSSEY 3,068,965
AUTOMATIC ADJUSTER
Original Filed Feb. 20, 1956 3 Sheets-Sheet 1

INVENTOR.
JOSEPH L. MOSSEY.
BY John A. Young
ATTORNEY.

Dec. 18, 1962   J. L. MOSSEY   3,068,965
AUTOMATIC ADJUSTER
Original Filed Feb. 20, 1956   3 Sheets-Sheet 2
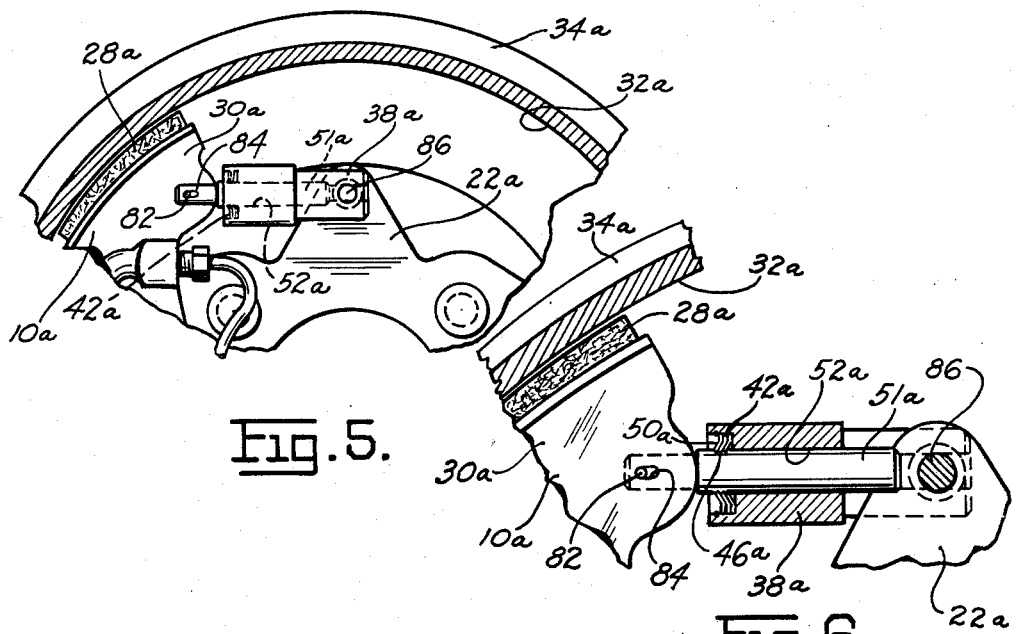
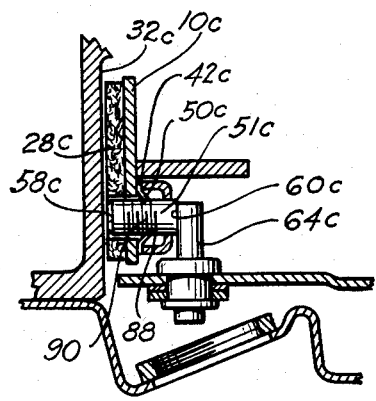
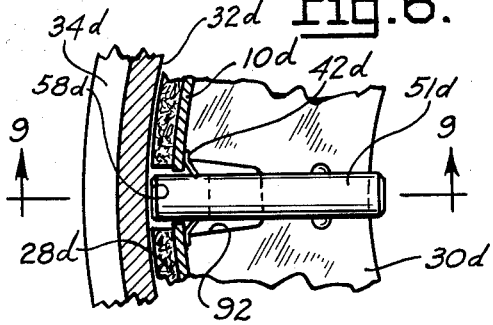
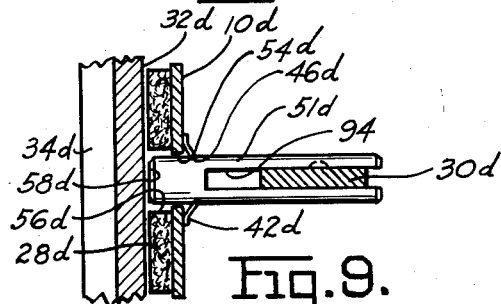
INVENTOR.
JOSEPH L. MOSSEY.
BY
John A. Young
ATTORNEY.

Dec. 18, 1962    J. L. MOSSEY    3,068,965
AUTOMATIC ADJUSTER
Original Filed Feb. 20, 1956    3 Sheets-Sheet 3

INVENTOR.
JOSEPH L. MOSSEY.
BY John A. Young
ATTORNEY.

United States Patent Office 3,068,965
Patented Dec. 18, 1962

3,068,965
AUTOMATIC ADJUSTER
Joseph L. Mossey, South Bend, Ind., assignor to The Bendix Corporation, South Bend, Ind., a corporation of Delaware
Original application Feb. 20, 1956, Ser. No. 566,428. Divided and this application Aug. 17, 1960, Ser. No. 50,130
2 Claims. (Cl. 188—79.5)

This is a divisional application of my copending application Serial No. 566,428, filed February 20, 1956, now abandoned.

This invention relates to an automatic adjuster for friction devices such as brakes for motor vehicles and the like.

It is an object of the invention to adjust a friction component of the brake (for example, the brake shoe) responsively to wear thereof, so that the effect of wear of the position of the operating pedal is negligible throughout the wear life of the brake.

It is a further object of the invention that this adjustment shall be accurate and relatively free from the complication of "overadjustment." It is also an object of the invention to adjust the brake by minute increments so that the brake pedal travel does not vary with brake wear.

From a structural standpoint, it is an object of the invention to reduce and simplify the number of parts of the adjusting device so that it is economical to manufacture, install and service.

Other objects and features of the invention will become apparent as the description develops with reference to the accompanying drawings wherein a plurality of embodiments of the invention are disclosed by way of example.

In the drawings:

FIGURE 5 shows a further embodiment of the invention shown in combination with the fragmentary portion of a brake shoe;

FIGURE 6 is a section view of the adjuster shown in FIGURE 5;

FIGURE 7 is a variation of the invention in which adjustment takes place in definite increments;

FIGURES 8 and 9 are section views of a further embodiment of the invention, FIGURE 8 being a section view taken through the width of the shoe and FIGURE 9 taken transversely of FIGURE 8 as indicated by arrows 9—9 in FIGURE 8;

Figure 12:
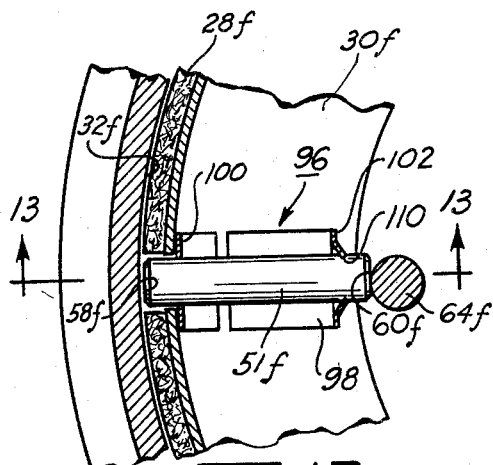
Figure 13:
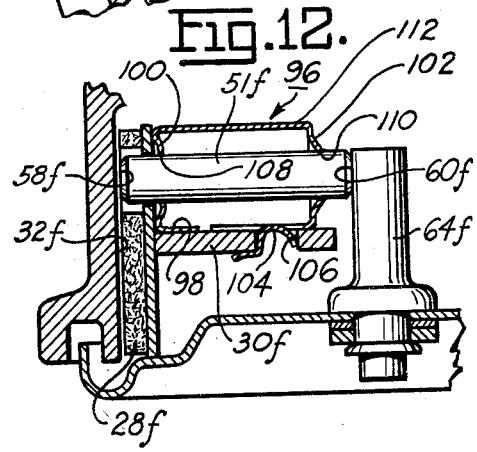
Figure 14:
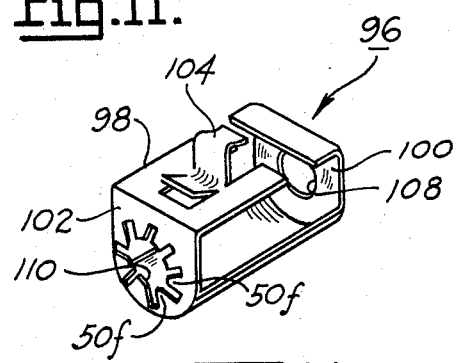

FIGURES 12 and 13 show a yet further embodiment of the invention with the section views being taken in the same manner as FIGURES 8 and 9; and FIGURE 14 is a perspective detail view of the adjuster device per se shown in FIGURES 12 and 13.

Figure 1:
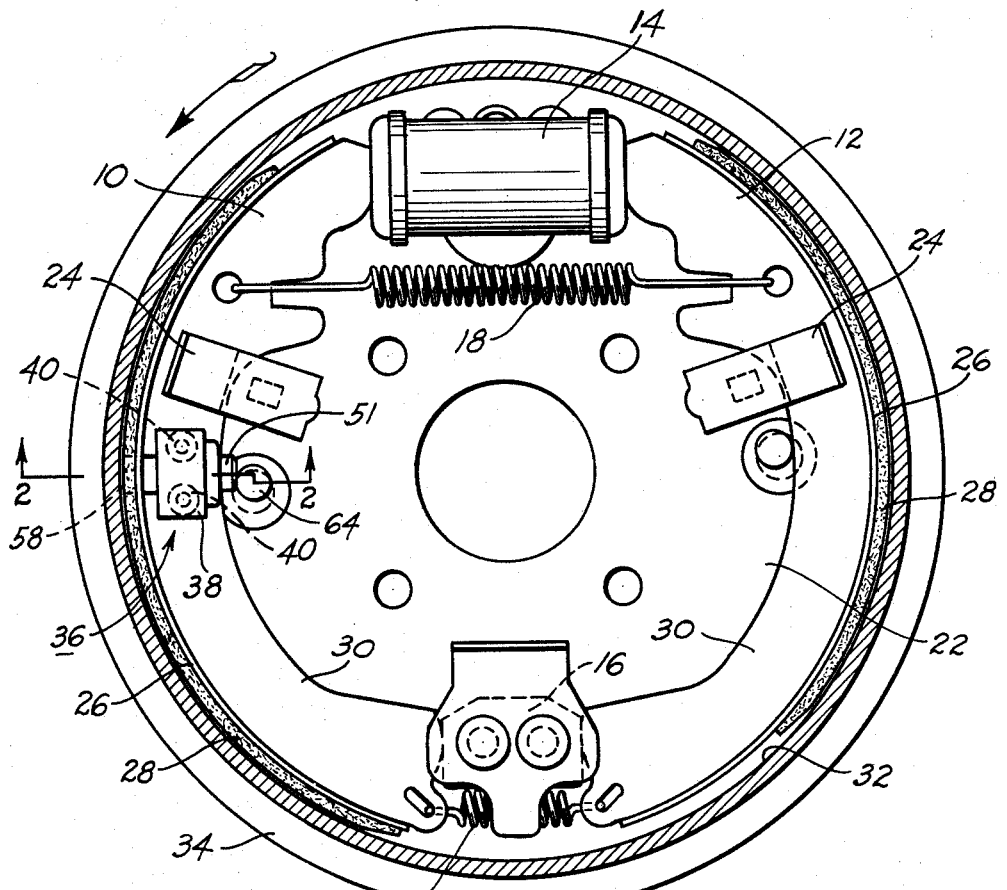
FIGURE 1 is a side elevation of a brake which has one embodiment of the invention installed therein.
Figure 2:
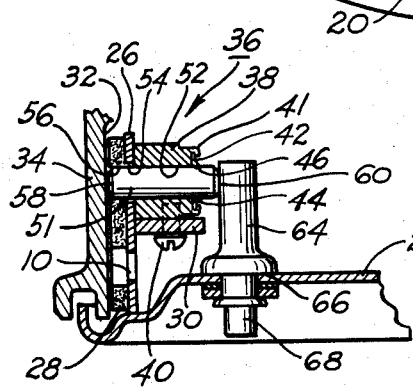
FIGURE 2 is a section view of the automatic adjuster shown in FIGURE 1.

Referring first to the embodiment shown in FIGURES 1 and 2, a pair of brake shoes 10 and 12 are actuated at one end by a fluid motor 14 and anchor at the opposite end on anchor 16. The shoes are maintained in a normally retracted position by a return spring 18, and are held in engagement with the anchor 16 by a second spring 20. The brake shoes are supported laterally by a torque plate 22 which may be fixed to a suitable part of the vehicle in any desired manner. Hold down devices 24 prevent the shoes from moving away from the torque plate.

Each of the shoes are identically constructed so that only one of them need be described. The brake shoe 10 is T-shaped in cross section and includes a rim 26 having friction material lining 28 and a transverse strengthening web 30. Friction material lining 28 is engageable with the cylindrical surface 32 of a rotatable drum 34.

Only one automatic adjuster, designated generally by reference numeral 36, is provided. The adjuster is used in conjunction with the "leading" shoe 10 in a non-servo brake, since the wear rate of this shoe far exceeds the wear rate of the "trailing" shoe 12. Forward rotation of the brake is counterclockwise as indicated by the arrow in FIGURE 1.

The automatic adjuster 36 includes a pilot member 38 which may consist of a rectangular shaped block. The pilot 38 is securely fastened to the web 30 by screws 40 and moves therewith. At the end 41 of the pilot there is a recess 42 which receives a washer member 44. Opening 46 in the washer is notched to form a number of inclined detents 50 (see FIGURE 4). A plunger 51 passes through aligned openings 46, 52, 54 and 56 in the washer member, pilot, rim and lining, respectively (see FIGURE 2). End 58 of the plunger 51 contacts cylindrical surface 32 of the drum and end 60 contacts the end of an eccentrically mounted post 64.

The post 64 is fastened to the torque plate 22 and has a shoulder 66 which holds the post against bending and twisting on the torque plate 22. End 68 of the post may be formed with flattened sides so that any suitable tool can be used for turning the post and thus varying the radial distance between the post 64 and cylindrical surface 32.

In operation, the brake shoe 10 is actuated by the fluid motor 14 in a radially outward direction against the resistance of spring 18 to bring lining 28 into forceable engagement with surface 32 of the drum. The adjusting device 36 is carried with the shoe during actuation of the shoe. The end 58 of the plunger 51 is level with the surface of the lining 28 so that as the lining 28 engages the drum so does the end 58. As the lining 28 wears, the inclined detents 50 of the washer 42 permit the adjusting device 36 and shoe 10 to move radially outward relative to the plunger 51 (referring to FIGURE 2) It is assumed that the end 58 of the plunger 51 does not wear, or at least its wear is insignificant compared to the wear rate of the friction material lining. Wear of the lining 28 produces a radially outward displacement of both the shoe and the adjusting device relative to the plunger-feeler-gauge 51.

The inclined detents 50 prevent movement of the adjusting device 36 on the plunger 51 in a radially inward direction. The shoe is thus held in its new position relative to the plunger 51, said plunger being returned to engagement with the post 64 under the influence of the return spring 18. The plunger 51 is shorter in length than the radial distance between the post 64 on the surface 32 of the drum, and this difference in length represents the clearance which is maintained between the shoe lining and the surface 32 of the drum.

Even though the surface of the friction material 28 becomes worn and reduces in width, the engageable surface of the lining 28 is maintained level with the end 58 of the plunger by virtue of shoe movement relatively to the plunger, and thus the shoe maintains its clearance from the surface 32 of the drum irrespective of the degree of wear of the lining 28.

The initial clearance between the shoe lining and drum surface 32 is obtained by pulling the plunger 51 against the post 64 and then rotating the post 64 until the eccentric surface establishes the desired radial distance between the post 64 and the surface 32. The post is then locked in this selected position against further movement.

Figures 3, 4:
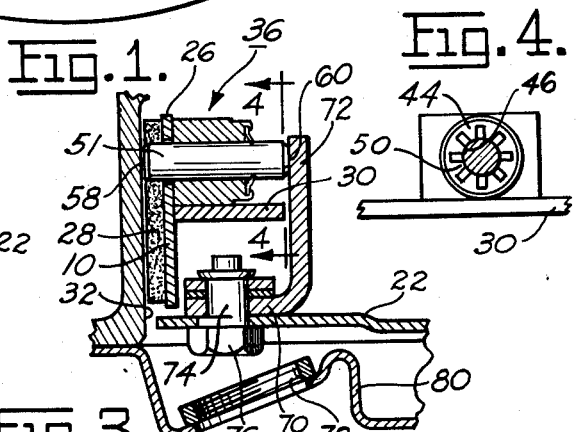
FIGURE 3 is a slightly enlarged view of the adjuster shown in FIGURE 2, but with a different stop.
FIGURE 4 is an end view looking in the direction indicated by the arrows 4—4 in FIGURE 3.

As shown in FIGURE 3, the post 64 may be substituted with an angular piece which has a base 70 and an upright flange 72 which engages the end of the plunger 51. The angular piece may be moved by turning an eccentric stem 74 with any suitable tool fitted over the head 76. The angular piece is thus moved to establish any desired clearance of the shoe lining from the cylindrical surface 32 of the drum, whereupon the angular piece is locked in position against any further movement. An opening 78 may be provided in the drum seal 80 in order to obtain access to the head 76. The construction and operation of the adjuster is the same as the embodiment shown in FIGURES 1 and 2.

Referring now to the embodiments shown in FIGURES 5 and 6, parts of the adjuster corresponding to those previously described will retain the same reference numeral, but also include the subscript "a." The plunger 51a is connected to the web 30a of the shoe 10a by means of a pin 82. This connection is through an oblong opening 84 in the web which provides lost motion enabling the shoe to be retracted slightly, thus establishing a clearance between the shoe lining 28a and the cylindrical surface 32a of the drum 34a. The pilot 38a is a cylinder with an opening 52a therethrough. At one end of the pilot is a pivotal connection 86 with a torque plate 22a and at the other end is a stack of washers 42a. The openings 46a in the washers are notched to form a plurality of inclined detents 50a which encircle and grip the plunger 51a.

When the shoe is applied, and the lining 28a is worn incident to a brake application, the radial movement of the shoe is in excess of that provided by the lost motion 84, and the shoe thus pulls the plunger therewith against the retarding effort of the washers. The plunger is pulled toward the drum relatively to the pilot and the stack of washers. When the brake is released, a return spring pulling on the shoe radially retracts the shoe from the drum through the distance permitted by the lost motion 84. The return springs cannot move the plunger rightwardly relative to the pilot 38a and the washers 42a, since the inclination on the detents 50a bites into the periphery of the plunger to prevent this. Movement of the plunger by radially outward motion of the shoe adjustably repositions the shoe closer to the drum, responsively to wear the lining 28a, and the clearance of the lining 28a from the drum is maintained, even though the lining has reduced in width.

The automatic adjuster acts as a one-way clutch which displaces the shoe radially outwardly by minute increments, responsively to wear of the lining, in order to maintain a constant clearance of the lining irrespective of the degree of wear of the lining. It is not essential to the invention that the washers be located in stacks. They may be set apart relative to each other to contact the plunger at spaced intervals if thus desired. It is only essential to the invention that the plunger be permitted to move radially outward by minute increments, but is prevented from movement in the opposite direction by the frictional resistance of the inclined detents.

In FIGURE 7 there is shown an embodiment of the invention in which adjustments take place in definite determined increments. The plunger 51c is engageable at one end 60c with an eccentrically mounted post 64c and the other end 58c is level with the surface of the friction material lining on the shoe 10c. When the shoe is applied, the end 58c engages surface 32c of the drum and as the lining wears, the shoe moves radially outwardly relative to the plunger 51c. If this radially outward movement of the shoe is sufficient, then the detent 50c on the washer 42c will ride over the land 88 and snap into a successive groove 90 formed in the surface of the plunger 51c. There are a number of spaced grooves 90 which are formed in the surface of the plunger and the spacing of these grooves determines the increments by which the shoe is adjusted radially outwardly.

The difference between the length of the plunger 51c and the radial distance between the post 64c and the surface 32c of the drum determines the clearance of the shoe. Should this clearance be exceeded, owing to wear of the shoe lining, then the shoe moves closer to the drum by increments equaling the distance between successive notches. The inclination of the detent 50c prevents radially inward movement of the shoe which is thus maintained in its adjusted position.

Referring to FIGURES 8 and 9, it will be seen that the plunger can be mounted midway between the sides of the shoe. In this case the plunger 51d is located within a notch 92 that is formed in the web 30d of the shoe. The plunger 51d is slotted in 94 (FIGURE 9) in order to extend on each side of the web 30d. The end of the slotted portion engages a fixed stop (not shown). The end 58d extends through aligned openings 46d, 54d and 56d in the washer, rim and lining, respectively, and contacts surface 32d of the drum. As the lining 28d wears, the shoe moves radially outwardly to the plunger.

The principal advantage of this construction is that the plunger 51d is located midway on the width of the shoe to avoid lateral offset loading of the shoe.

It will be noted that the washer 42d is secured directly to the rim 10d of the shoe. The washer constitutes a one-way clutch which permits the shoe to move adjustably radially outwardly, but prevents movement of the shoe relatively to the plunger in a radially inward sense.

Figure 10:
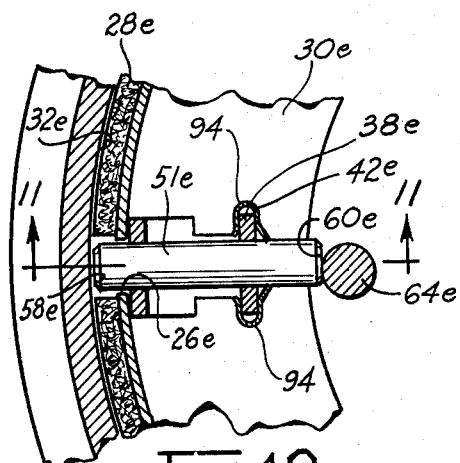
FIGURES 10 and 11 show a further embodiment of the invention in section views taken in the same direction as FIGURES 8 and 9.
Figure 11:
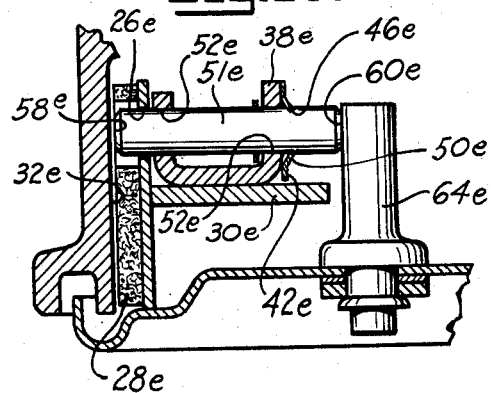

In FIGURES 10 and 11 there is shown a U-shaped cross section member 38e, the base thereof lying flat against the web 30e of the shoe. Each upright side of the member has an opening 52e which pilots the plunger 51e. End 58e of the plunger extends through the openings in the rim 26e and lining 28e and is engageable with the cylindrical surface 32e of the drum. End 60e of the plunger contacts an eccentric post 64e the same as in the previous embodiments. A clutch device 42e is supported on one of the upright sides of the member 38e. The clutch member is made from a spring steel stamping. The clutch device 42e has two resilient bends 94 which are sprung over one of the upright sides 38e and thus clamped thereto.

An opening 46e is formed in the one side of the clutch. This opening is notched to form a number of inclined detents 50e which grip the surface of the plunger and permit movement of the shoe, relative to the plunger, in a radially outward direction only, just as in the previous embodiments. Thus, when the shoe is applied and the lining wears, the shoe can move outwardly toward the drum but is prevented from moving radially inwardly because of the inclination of the detents 50e. The modified construction of the clutch member does not influence the over-all operation and is substantially the same as the embodiment shown in FIGURES 1 to 4.

In a further embodiment of the invention, the adjusting device may be formed as a single stamped part. In FIGURES 12 to 14 the adjusting device includes a shell 96 having a base 98 and two transverse end portions 100 and 102. The base lies flat against the web 30f of a brake shoe and a struck portion 104 is sprung into an undersized opening 106 in the web to retain the shell in operative position. Each of the ends 100 and 102 has openings 108 and 110, respectively, through which a plunger 51f extends. End 60f of the plunger contacts eccentric stop 64f and end 58f engages the cylindrical surface 32f of the drum just as in the previous embodiments. The plunger passes through openings in the rim and the lining and the end 58f is level with the friction surface of the lining just as in the previous embodiments.

The opening 110 in the side 102 is notched to form inclined detents 50f which serve the same purpose as the detents in the previous embodiments. Even though the sides 100 and 102 are relatively thin, they are stiffened against buckling by the connecting base 98 and side 112.

In operation, the shoe is actuated and as the lining 28f wears, the shoe moves closer to the drum carrying the shell 96 therewith. The shell moves radially outwardly relative to the plunger. After the brake is released, the shoe is retracted, carrying the shell therewith, said shell also carrying the plunger. The shoe is retracted until the plunger 51f contacts the post 64f whereupon further shoe retraction is prevented because the detents 50f on the shell prevent movement of the shell toward the right relatively to the plunger, and the shell is fixed to the shoe. It will be noted, however, that the shell can have moved the shoe radially outward to displace the shoe closer to the drum so that the clearance of the shoe is maintained regardless of the degree of wear of the lining 28f.

Although this invention has been described in conjunction with certain selected embodiments of the invention, it will be understood by those skilled in the art that numerous modifications, additions and revisions may be made of the invention without departing from the underlying principles thereof. I intend, therefore, to include within the terms of the following claims all such modifications, revisions and additions which are reasonably expected from those skilled in the art.

I claim:

1. In a brake having an arcuate T-section brake shoe including a rim, a transverse strengthening web, and a lamination of friction material lining supported on said rim and engageable with an opposing cylindrical drum braking surface, an adjuster comprising a sheet metal stamping including a base located to lie against one side of said shoe web in flat face engagement therewith, a struck portion of said base which extends through a companion opening in the web of said shoe to couple said adjuster and shoe together, two spaced pilot walls of said adjuster having aligned openings with one of said walls disposed against the side of said rim remotely from the lining supporting side thereof, a plurality of teeth surrounding the opening in the other wall of said adjuster and forming a one-way clutch connection, a plunger slidably movable through the aligned openings of said walls and gripped at the outer periphery by the teeth forming said clutch to effect a slidable connection enabling relative movement between said plunger and adjuster in a shoe applying direction only, a stop which is engaged by one end of said plunger to define the retracted position of said shoe, the other end of said plunger being movable through an opening of said shoe rim aligned with said wall openings for engagement with the cylindrical surface of said drum to fix the radial position of said plunger and thereafter provide relative radial movement of said shoe along the length of said plunger and effect adjustment of said shoe, and means in addition to said base for joining said spaced walls and effecting stiffening of the one piece adjuster comprising said adjuster.

2. In a brake having an arctuate T-section brake shoe including a rim, a transverse strengthening web, and a lamination of friction material lining supported on said rim and engageable with an opposing cylindrical drum braking surface, a one piece adjuster comprising a sheet metal stamping including a base located to lie against one side of said shoe web in flat face engagement therewith, a struck portion of said base which extends through a companion opening in the web of said shoe to couple said adjuster and shoe together, two spaced pilot walls of said adjuster having aligned openings, a plurality of teeth surrounding the opening in one wall of said adjuster and forming a one-way clutch connection, an opening in said shoe rim aligned with said wall openings, a plunger slidably movable through the aligned openings of said walls and said rim and gripped at the outer periphery by the teeth forming said clutch to effect a slidable connection enabling relative movement between said plunger and adjuster in a shoe applying direction only, and means in addition to said base for joining said spaced walls and effecting stiffening of the one piece adjuster comprising said adjuster.

References Cited in the file of this patent
UNITED STATES PATENTS

| | | |
|---|---|---|
| 1,755,829 | Loughead | Apr. 22, 1930 |
| 2,559,363 | Mace | July 3, 1951 |
| 2,559,830 | Pistoles et al. | July 10, 1951 |
| 2,675,055 | Singleton | Apr. 13, 1954 |

FOREIGN PATENTS

| | | |
|---|---|---|
| 984,942 | France | Mar. 7, 1951 |
| 666,662 | Great Britain | Feb. 12, 1952 |